(12) United States Patent
Wolpers et al.

(10) Patent No.: US 10,023,438 B2
(45) Date of Patent: Jul. 17, 2018

(54) CONVEYING SYSTEM FOR OPEN-CAST MINING

(71) Applicants: ThyssenKrupp Industrial Solutions AG, Essen (DE); thyssenkrupp AG, Essen (DE)

(72) Inventors: Franz Wolpers, Kirkel (DE); Matthias Spanke, Saarbrücken (DE); Benjamin Donner, Saarbrücken (DE); Wei Ye, Saarbrücken (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/550,988

(22) PCT Filed: Jan. 14, 2016

(86) PCT No.: PCT/EP2016/050607
§ 371 (c)(1),
(2) Date: Aug. 14, 2017

(87) PCT Pub. No.: WO2016/131566
PCT Pub. Date: Aug. 25, 2016

(65) Prior Publication Data
US 2018/0022580 A1      Jan. 25, 2018

(30) Foreign Application Priority Data
Feb. 16, 2015   (DE) .................. 10 2015 001 825

(51) Int. Cl.
*B65G 17/20*    (2006.01)
*B66B 19/00*   (2006.01)
(Continued)

(52) U.S. Cl.
CPC ............ *B66B 19/00* (2013.01); *B65G 17/126* (2013.01); *B65G 17/20* (2013.01); *B65G 67/08* (2013.01);
(Continued)

(58) Field of Classification Search
CPC ......... B66B 9/06; B66B 9/0861; B66B 17/04; B65G 17/20; B65G 17/126; B65G 67/08; B65G 67/24
(Continued)

(56) References Cited

U.S. PATENT DOCUMENTS 1,433,926 A  *  10/1922  Barton .................... B66C 21/00
                                                              212/111
1,993,081 A  *   3/1935  Anderson ................ B66B 9/06
                                                              414/598
(Continued)

FOREIGN PATENT DOCUMENTS

AT          512828 A       11/2013
DE         2948035 A        6/1981
(Continued)

OTHER PUBLICATIONS

English translation of International Search Report issued in PCT/EP2016/050607 dated Apr. 20, 2016 (dated Apr. 29, 2016).
English abstract for AT512828A.

*Primary Examiner* — Joseph Dillon, Jr.
(74) *Attorney, Agent, or Firm* — thyssenkrupp North America, Inc.

(57) ABSTRACT

A conveying installation that is positionable over an oblique slope of an opencast mine pit may be used to convey raw materials from a lower height level on an extraction level of the opencast mine to an upper height level at a ground level adjacent to the opencast mine pit. At least one conveying container can be loaded with raw materials at the lower height level and unloaded at the upper height level. At least (Continued)

one bearing cable for load-bearing and control and one traction cable for moving the conveying container may be provided. At least at the upper height level, a support element may be disposed, to which the bearing cable is attached and on which the traction cable is guided.

12 Claims, 4 Drawing Sheets

(51) Int. Cl.
    *E21F 13/04* (2006.01)
    *B66C 21/00* (2006.01)
    *B65G 67/08* (2006.01)
    *B65G 67/24* (2006.01)
    *B65G 17/12* (2006.01)

(52) U.S. Cl.
    CPC .............. *B65G 67/24* (2013.01); *B66C 21/00* (2013.01); *E21F 13/04* (2013.01)

(58) Field of Classification Search
    USPC ...... 198/703, 704, 711, 712; 212/83, 84, 85, 212/97, 98, 99, 100, 101, 102, 103, 104, 212/105, 106, 107, 108, 109, 110, 111
    See application file for complete search history.

(56) References Cited

U.S. PATENT DOCUMENTS

| | | | | |
|---|---|---|---|---|
| 2,291,387 A * | 7/1942 | Hale | .......................... | B66B 9/06 414/598 |
| 2,499,060 A * | 2/1950 | Goldberg | .................. | B66B 9/06 104/94 |
| 3,011,653 A | 12/1961 | Larsen | | |
| 3,105,597 A * | 10/1963 | Knott | ........................ | B61B 7/02 212/115 |
| 3,543,946 A * | 12/1970 | Rennie | .................... | B66C 21/00 212/84 |
| 3,627,079 A * | 12/1971 | Nielsen | ..................... | B66B 9/06 182/178.1 |
| 3,826,335 A * | 7/1974 | Allen | ......................... | B66B 9/06 182/10 |
| 4,347,938 A * | 9/1982 | Gorsh | ...................... | B66C 21/08 104/115 |
| 4,473,160 A * | 9/1984 | Neuenschwander | . | B66C 23/202 182/37 |
| 4,534,451 A * | 8/1985 | Peter | .......................... | B66B 9/06 187/245 |
| 4,796,748 A * | 1/1989 | Manning | ................. | B65G 23/42 198/537 |
| 4,979,593 A * | 12/1990 | Watanabe | .................. | B66B 1/16 104/112 |
| 5,199,580 A * | 4/1993 | Bankier | ................ | A01D 46/243 211/113 |
| 5,346,052 A * | 9/1994 | Fox | ....................... | A01K 5/0266 198/350 |
| 6,145,679 A * | 11/2000 | Walters | .................... | B66C 21/00 212/76 |
| 2011/0266011 A1* | 11/2011 | Lee | ........................... | A62C 3/02 169/52 |
| 2012/0303224 A1* | 11/2012 | Keefer | ..................... | E02F 3/304 701/50 |
| 2013/0112103 A1* | 5/2013 | Elhard | ...................... | B61B 7/00 104/93 |
| 2014/0116282 A1* | 5/2014 | Horihan | .................... | B61B 3/02 104/89 |
| 2014/0374220 A1 | 12/2014 | Werre et al. | | |
| 2015/0288251 A1* | 10/2015 | Nakasone | ............... | H02J 15/00 290/1 D |
| 2016/0130079 A1 | 5/2016 | Becker et al. | | |

FOREIGN PATENT DOCUMENTS

| | | |
|---|---|---|
| DE | 102012100765 A | 8/2013 |
| DE | 102013105937 A | 12/2014 |
| FR | 529097 A | 11/1921 |
| SU | 420546 A | 3/1974 |

* cited by examiner

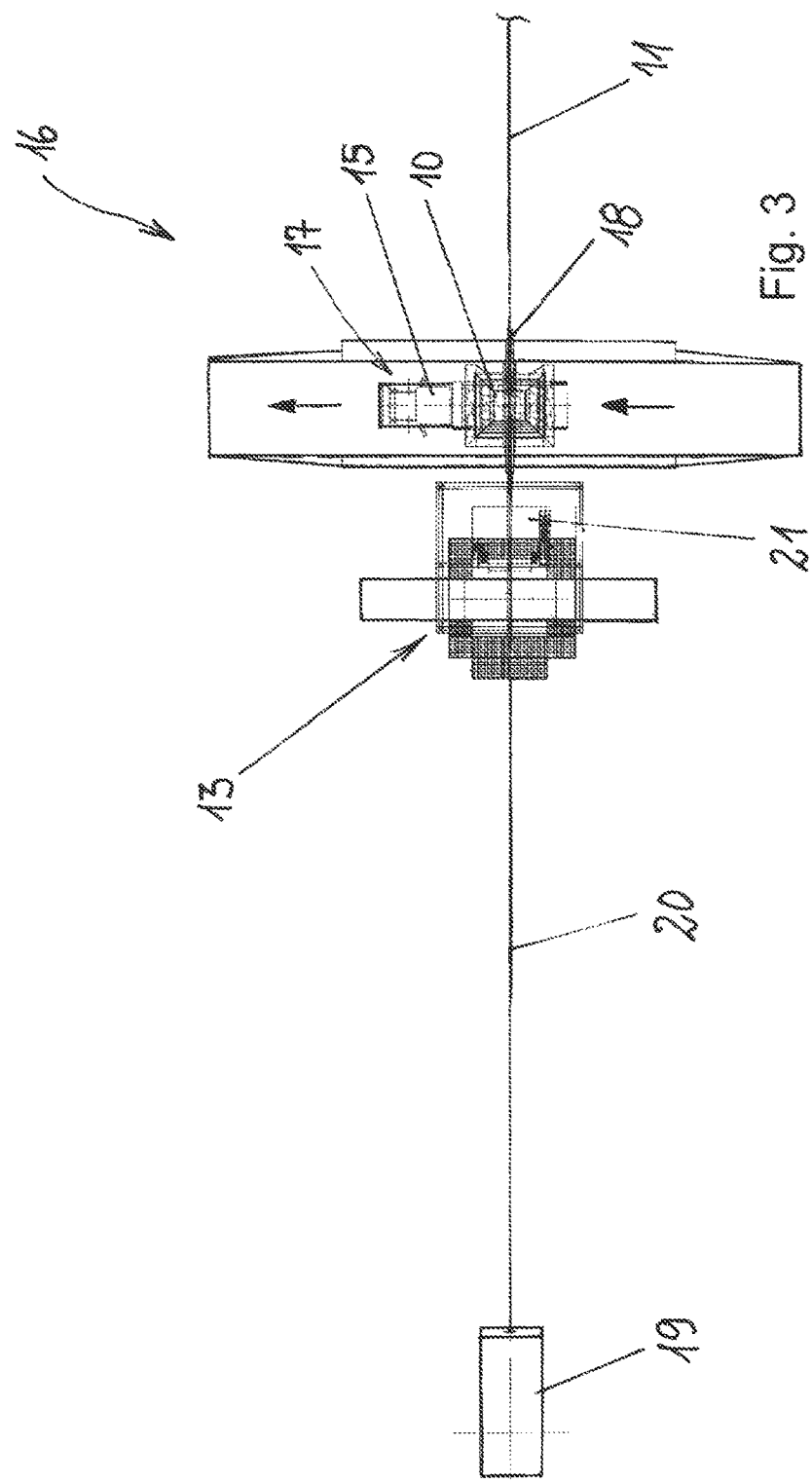

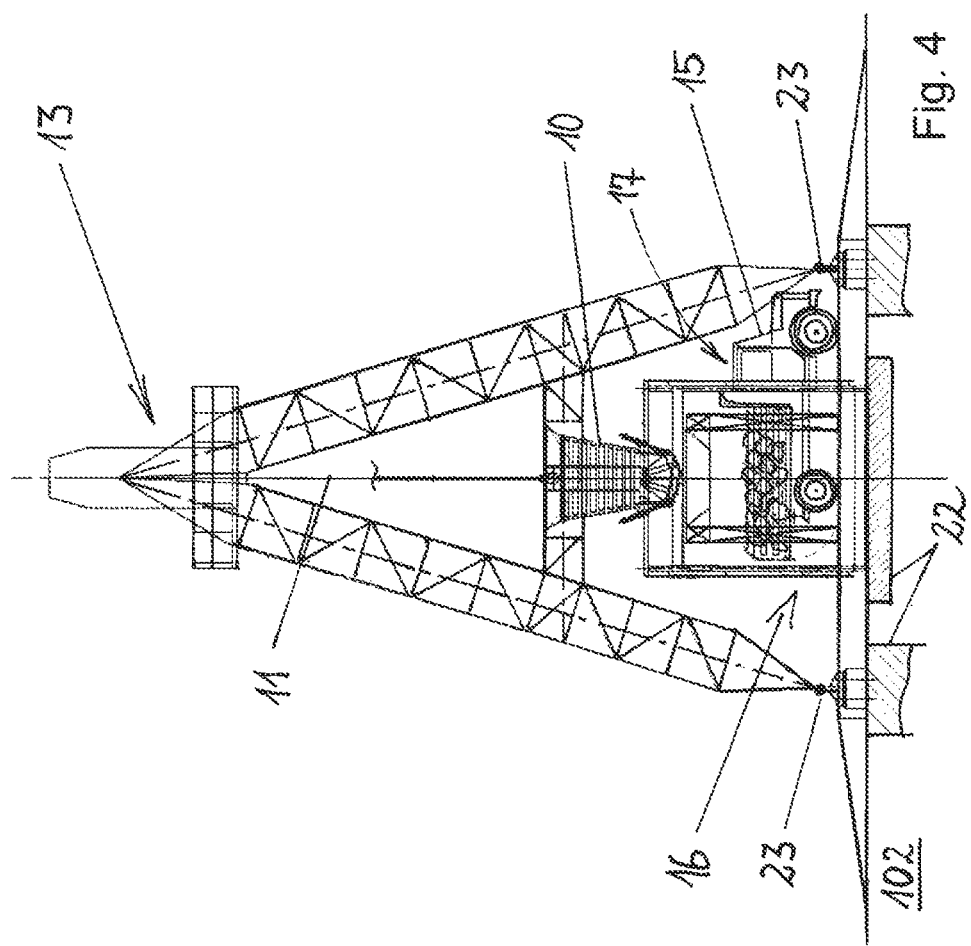

CONVEYING SYSTEM FOR OPEN-CAST MINING

CROSS REFERENCE TO RELATED APPLICATIONS

This application is a U.S. National Stage Entry of International Patent Application Serial Number PCT/EP2016/050607, filed Jan. 14, 2016, which claims priority to German Patent Application No. DE 10 2015 001 825.6 filed Feb. 16, 2015, the entire contents of both of which are incorporated herein by reference.

FIELD

The present disclosure generally relates to mining systems, including conveying systems for open-cast mining.

BACKGROUND

DE 10 2012 100 765 A1 discloses a steep conveying installation for arrangement on a slope of an opencast mine pit, by means of which steep conveying installation raw materials can be transported from a lower height level, in particular from an extraction level of the opencast mine, to an upper height level, formed in particular by a ground level, the steep conveying installation having a line arranged on the slope. On the line, a first conveying cage and a second conveying cage can travel movably relative to one another, and the conveying cages on the line are connected to one another by means of a common traction mechanism. The line comprises a steel structure of lattice type of construction and comprises rails on which the conveying cages can travel by means of rail wheels. For the fastening of the line, several fastening points are provided at regular intervals, by means of which fastening points the line is anchored in the rock of the slope. The line construction yields a cumbersome design of the steep conveying installation, with relatively high construction and building costs. For relatively small applications, in which it is sought in particular for setting up and dismantling again to be performed with little outlay, and which do not serve for industrial-scale use, the previously known steep conveying installation has only limited suitability. It is designed more for constant use in a very large opencast mine, and it is an object of the present invention to simplify the design, the construction and the installation of a steep conveying installation. Here, it is the intention in particular for the steep conveying installation to be suitable for overcoming even relatively small conveying heights between the lower and the upper height level. In particular, it is the intention for the conveying installation of the above-described type of construction to be connected to the opencast mine pit only at the fewest possible locations.

Relatively small conveying installations are known from the forestry sector, as presented for example in U.S. Pat. No. 3,011,653 A. Said installation comprises a cable system with a bearing cable and a traction cable, wherein the traction cable is connected to a traveling carriage on which the load can be arranged in suspended fashion. The presented installation is however not dimensioned, and also cannot be qualified, for the conveying of raw materials from an opencast mine, because the loading and unloading of the installation is only expediently possible with wood.

AT 512 828 A2 presents a further conveying installation, in particular for alpine use, wherein the installation is designed for so-called skidding over vertical distances. The presented installation is likewise not suitable for conveying raw materials out of an opencast mine pit of an opencast mine.

BRIEF DESCRIPTION OF THE FIGURES

FIG. 3 is a plan view of an example raw material receiving station at an upper height level of a conveying installation.

FIG. 4 is a side view of an example raw material receiving station at an upper height level.

DETAILED DESCRIPTION

Figure 1:
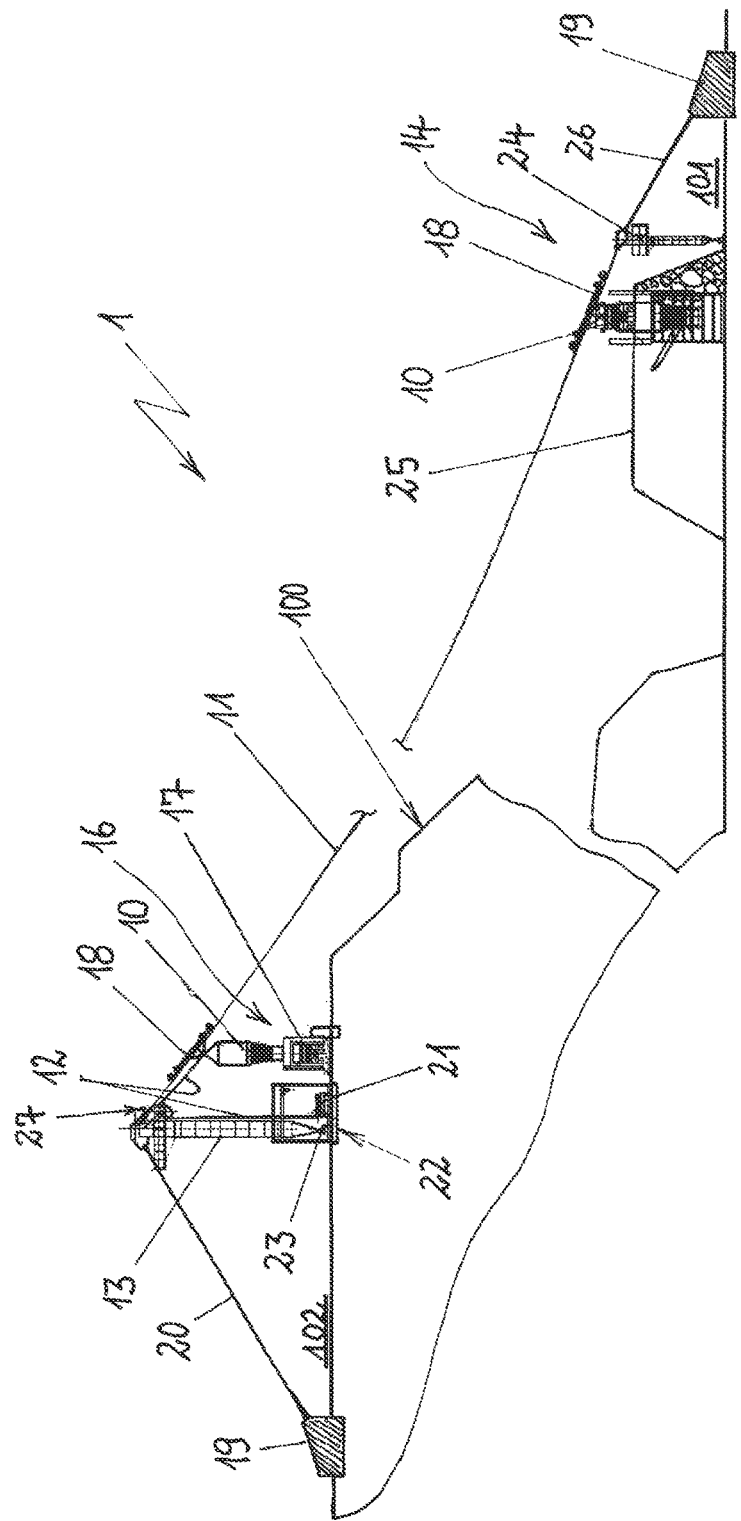
FIG. 1 is an elevated view of an example conveying installation disposed on a slope of an opencast mine pit.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a conveying installation for opencast mining. The conveying installation may be positioned over an oblique slope of an opencast mine pit, by means of which conveying installation raw materials can be conveyed from a lower height level on an extraction level of the opencast mine to an upper height level at ground level adjacent to the opencast mine pit. At least one conveying container may be provided, which can be loaded with raw materials at the lower height level and from which the raw materials can be unloaded at the upper height level. At least one bearing cable for load bearing and control and one traction cable for moving the conveying container may also be provided. At least at the upper height level, a support element may be set up, to which the bearing cable may be attached and on which the traction cable may be guided.

It is an object of the invention to further develop a conveying installation for arrangement over an oblique slope of an opencast mine pit, which conveying installation is intended to be suitable for conveying raw materials from a lower height level, from the extraction level of an opencast mine pit, to an upper height level, formed for example by a ground level, and it is the intention for the conveying installation to be of simple design and easy to install. In particular, it is the intention for the conveying installation to be designed such that, despite being suitable for conveying large masses, said conveying installation is of simple, lightweight construction and comprises only few attachment points to the opencast mine pit at the height levels.

According to the invention, to achieve said object, it is provided that, at a lower height level, a truck offloading station is set up, to which the conveying container can be guided such that the raw materials can be introduced from a truck, which can be driven to the truck offloading station, into the conveying container by means of a pouring process, and that, at the upper height level, a raw material receiving station is set up, over which the conveying container can be guided such that the raw materials can be unloaded from the conveying container into a raw material receiving means, such that the conveying installation is designed for incorporation into a truck transport operation for the raw materials.

The essence of the invention is the further development of a conveying belt installation for opencast mining which can be implemented without a line, wherein the conveying installation remains suitable for incorporation into a truck transport operation for the raw materials. The incorporation into the truck transport operation is, in the context of the present invention, achieved simply if the raw materials can be transferred, at least at the lower height level, from a truck into the conveying container of the conveying installation, such that the truck no longer has to overcome any height differences. The truck can remain at the lower height level, that is to say at the extraction level of the opencast mine, and the wear of the truck can be considerably reduced. The raw materials may be rubble, ores, stone, coal or other minerals, wherein the capacity of the conveying container is particularly advantageously coordinated with the capacity of a truck. It is thus possible to establish synchronization between the unloading of the truck at the extraction level of the opencast mine and the filling of the conveying container, wherein, in the context of the present invention, the conveying installation may be implemented with one conveying container or with two conveying containers, wherein two conveying containers can travel relative to one another in shuttle operation.

The simple design of the conveying installation with a cable system comprising at least one bearing cable and one traction cable permits a simple, filigree construction of the conveying installation without the arrangement of a line on the slope of the opencast mine pit, such that the conveying installation can also be qualified for relatively small opencast mining operations, quarries or open mines. Many mining operations operate with trucks in stone or limestone quarries with loads of 15 t to 35 t, depending on the truck, and have to manage a transport capacity of 500 t/h to 1000 t/h. The conveying installation of the present invention is intended to be qualified for this segment, which is achieved by virtue of the fact that the conveying installation can be of simple design but can be loaded by trucks at the lower height level.

At the upper height level, the conveying installation comprises a raw material receiving station, which is for example likewise formed by a truck loading station, and the raw material receiving means may be formed by at least one truck which is moved at the upper height level, that is to say at ground level, without the need to overcome further height differences. It is however alternatively also possible for the raw material receiving station to form a bunker station and/or a crusher station for comminuting the raw materials, and/or to form a belt installation station into which the raw materials can be unloaded from the conveying container. If the raw material receiving station is formed by a belt installation station, this may likewise comprise a bunker or a receiving funnel such that at least the content of a conveying container can be unloaded onto the belt installation station.

The raw material receiving station at the upper height level may particularly advantageously be formed adjacent to the support element. The support element, the drive unit and/or the raw material receiving station may be accommodated on a common foundation or on multiple foundations arranged adjacent to one another, such that substantially only one upper platform has to be provided for the installation of the conveying belt installation at the upper height level. There is consequently no need for further support elements distributed over the transport path.

At the upper height level, there may be provided a mass-based anchor to which the support element is braced by a bracing tension means. In the same way, at the lower height level, there may be provided a mass-based anchor to which a lower support element is braced by a bracing tension means. The mass-based anchors may preferably be of high mass and at least partially sunk into the ground at the upper height level and at the lower height level, at the edge of and in the opencast mine pit respectively. It is alternatively also possible for some other anchoring point to be selected, which is not imperatively based on a high resting mass, for forming a fastening point of the bracing tension means. The mass-based anchors particularly advantageously form a fastening unit with the support elements at the upper height level and at the lower height level in each case, wherein the bracing tension means are not formed by a lengthened bearing cable. The bearing cable extends preferably between the upper and the lower support element. The tensile force in the bearing cable is however in this case accommodated substantially by the bracing tension means, and the tensile force in the bearing cable may be equal to the tensile forces in the bracing tension means. This is the case in particular if the support elements are in the form of hinged supports, for which purpose the support elements are received by means of at least one hinged joint. In one refinement of the conveying installation, the conveying installation does not imperatively also comprise a support element at the lower height level, and the mass-based anchor at the lower height level may be arranged behind the truck offloading station such that the conveying container can be moved to the truck offloading station in an accurately positioned manner.

In a further advantageous embodiment, at least one traveling carriage is provided on which the conveying container is arranged in suspended fashion, wherein the traveling carriage is guided on the bearing cable, and wherein the traction cable is attached to the traveling carriage. At the upper height level, there is preferably provided a drive unit into which the traction cable can be pulled and out of which the traction cable can be deployed, wherein the drive unit is arranged adjacent to the support element. The arrangement of the drive unit adjacent to the support element offers the advantage that the drive unit and the support element at the upper height level can be accommodated by means of a common foundation. The upper support element preferably comprises a diverting roller over which the traction cable is guided, which yields a further simplification of the overall construction.

In the same way, the support element may be arranged at the lower height level adjacent to the truck offloading station. This offers the advantage of using the truck offloading station, which preferably comprises a truck ramp, as a foundation for accommodating the support element.

The conveying container is preferably constructed such that the raw materials can be loaded into the conveying container from an upper container side in the truck offloading station, wherein the conveying container can be unloaded from a lower container side in the raw material receiving station. In the truck offloading station, the conveying container is guided to below the level at which the trucks travel, such that said trucks can fill the conveying containers by way of a pouring process. For this purpose, a truck ramp serves as a major constituent part of the raw material receiving station. By contrast, at the raw material receiving station, conveying containers are moved to a level above a raw material receiving means, for example a further truck, in order for the raw materials to be unloaded from the conveying container again likewise under the action of gravitational force.

Finally, the conveying installation may be refined such that two bearing cables which run parallel to one another are provided, wherein a conveying container is received by means of a respectively associated traveling carriage on each of the bearing cables, and wherein the traction cable connects the two conveying containers to one another for shuttle operation of the conveying containers. For such an embodiment of the conveying installation, it is preferably the case that the support element at the upper height level is designed to be wide enough that both bearing cables can be guided over a single support element. For example, it is furthermore possible for only one bracing tension means to be provided between the upper support element and the mass-based anchor, which bracing tension means is correspondingly dimensioned for two bearing cables. It is also possible for the support element to be in the form of a hinged support with corresponding hinged joints, even though two bearing cables are provided. The bearing cables must have a spacing to one another which enables two conveying containers to travel in shuttle operation, such that one conveying container is moved up the slope of the opencast mine pit as a further conveying container is moved down.

In this way, the advantage is achieved that the inherent mass of the conveying containers and of the traveling carriages cancel one another out, such that the conveying installation can be operated in an energy-efficient manner.

FIG. 1 shows a conveying installation 1 in an overall view, and the conveying installation 1 is arranged over an oblique slope 100 of an opencast mine pit. Here, the conveying installation 1 extends between a lower height level 101 and an upper height level 102 and is also connected to the opencast mine pit only at these height levels 101 and 102. The lower height level 101 represents an extraction level for the extraction of raw materials, for example rubble, ores, coal or other minerals. The conveying installation is dimensioned such that it can convey for example approximately between 500 t/h and 1000 t/h.

The conveying installation 1 comprises a conveying container 10 which can travel between a truck offloading station 14 at the lower height level 101 and a raw material receiving station 16 at the upper height level 102.

For the control of the conveying container 10, a bearing cable 11 is stretched between the lower height level 101 and the upper height level 102, and a traveling carriage 18 is provided which travels on the bearing cable 11. The conveying container 10 is in this case arranged in suspended fashion under the traveling carriage 18. The conveying container 10 can be caused to travel by means of a traction cable 12 which is attached to the traveling carriage 18. The conveying container 10 can be caused to travel between the lower height level 101 and the upper height level 102 by means of a traction drive.

At the lower height level 101, the conveying installation 1 comprises a truck offloading station 14 which is designed for the loading of the conveying container 10 with raw materials from trucks. For this purpose, the truck offloading station 14 comprises a truck ramp 25, such that the conveying container 10 can be loaded by virtue of the raw materials being poured through an upper opening into the conveying container 10.

At the upper height level 102, the conveying installation 1 comprises a raw material receiving station 16 in which the conveying container 10 can be caused to travel over a raw material receiving means 17, and when the conveying container 10 is opened, the raw materials can be unloaded via a lower opening side into a raw material receiving means 17.

By way of example, the conveying installation 1 comprises two support elements 13 and 24, and a first support element 13 is set up at the upper height level 102 and a second support element 24 is set up at the lower height level 101. The bearing cable 11 is attached between the two support elements 13 and tensioned. On the side averted from the bearing cable 11, the support elements 13 and 24 are braced to mass-based anchors 19 by bracing tension means 20 and 26, and a first mass-based anchor 19 is arranged at the upper height level 102, such that the bracing tension means 20 extends between the upper mass-based anchor 19 and the support element 13. At the lower height level 101, the further mass-based anchor 19 is arranged behind the support element 24 on the side averted from the bearing cable 11, and the bracing tension means 26 extends between the mass-based anchor 19 and the support element 24. The mass-based anchors 19 form attachment points for the bracing of the support elements 13 and 24, and the mass-based anchors 19 may also be formed by non-mass-based attachment points in the ground.

The conveying container 10 is, for movement purposes, driven by means of a drive unit 21 via the traction cable 12, and the drive unit 21 is arranged adjacent to the upper support element 13. The traction cable 12 can be pulled into the drive unit 21 in order to cause the conveying container 10 to travel upward, and said traction cable can be deployed out of the drive unit in order to cause the conveying container 10 to travel downward, and in the upper region of the support element 13, there is situated a diverting roller 27 about which the traction cable 12 is guided. This yields particularly simple set-up of the drive unit 21 and simple guidance of the traction cable 12. In particular, the drive unit 21 may lie, together with the support element 13, on a single-part or multi-part foundation 22 which is sunk into the ground at the upper height level 102.

The conveying installation 1 is shown by way of example with two support elements 13 and 24, wherein the support element 13 is required for the bracing of the bearing cable 11 at the upper height level 102, whereas the support element 24 at the lower height level 101 may also be omitted, and the bearing cable 11 is braced directly on the lower mass-based anchor 19 at the lower height level 101, for example directly behind the truck offloading station 14.

Figure 2:
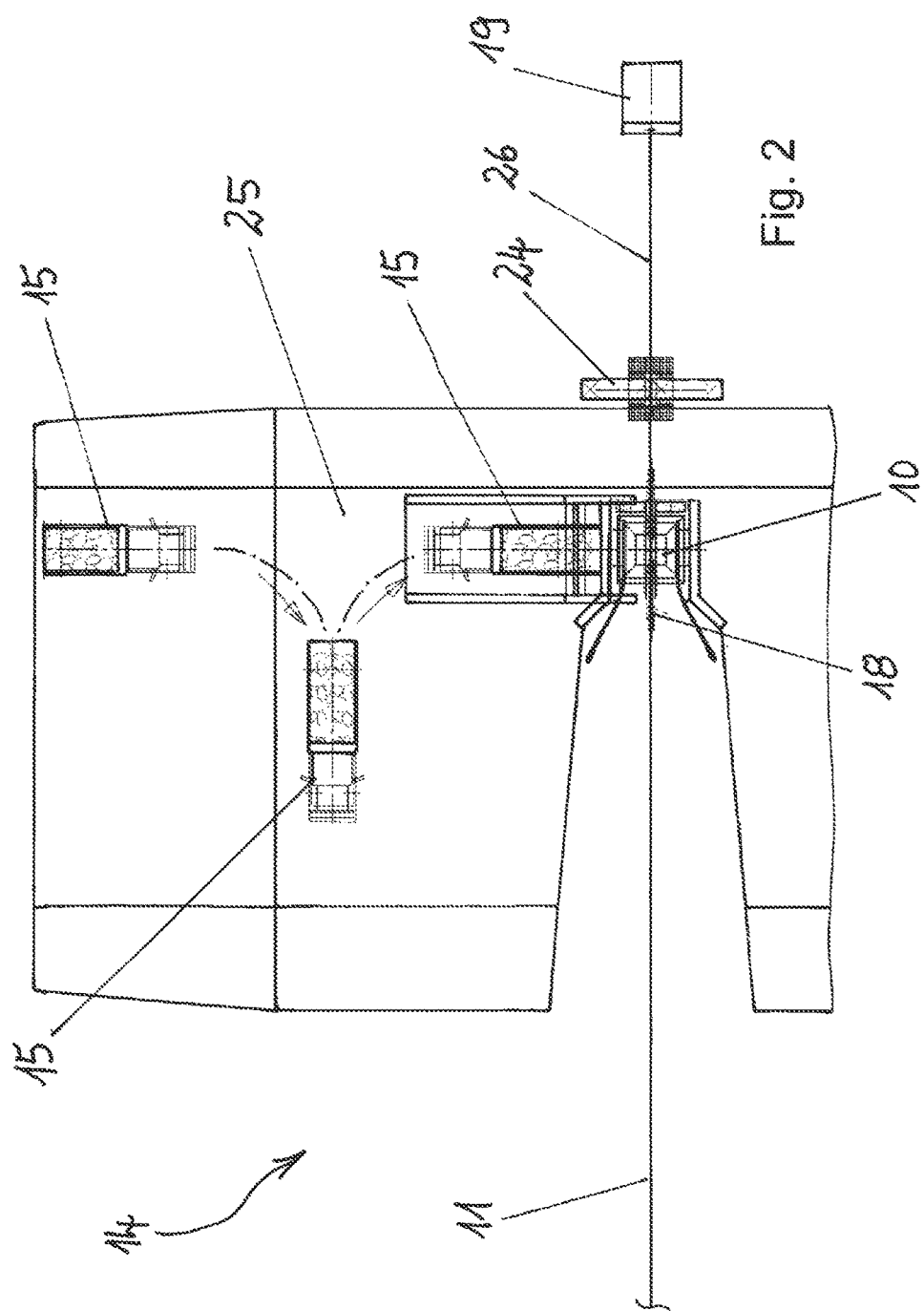
FIG. 2 is a plan view of an example truck offloading station at a lower height level of a conveying installation.

FIG. 2 shows a plan view of the truck offloading station 14 at the lower height level 101. The truck offloading station 14 comprises, as a major constituent part, a truck ramp 25 onto which trucks 15 can travel. By way of example, multiple trucks 15 are shown which are laden with raw materials. The bearing cable 11 runs over the truck ramp 25 and is supported by means of the support element 24 and is braced by means of the bracing tension means 26 and the mass-based anchor 19. The traveling carriage 18 can travel on the bearing cable 11, and the conveying container 10 is arranged in suspended fashion under the traveling carriage 18. The conveying container 10 is situated at a level below the surface of the truck ramp 25, such that the raw materials can be introduced into the conveying container 10 by being poured from the truck 15 through an upper filling opening.

FIG. 3 shows a plan view of the raw material receiving station 16 at the upper height level 102. The bearing cable 11 is attached to the support element 13 and is braced to the mass-based anchor 19 by the bracing tension means 20. The drive unit 21 which serves for driving the movement of the conveying container along the bearing cable 11 is arranged directly at the support element 13. The conveying container 10 is received in suspended fashion on the traveling carriage 18, and the traveling carriage 18 can be caused to travel along the bearing cable 11.

The raw material receiving station 16 serves for the unloading of the raw materials from the conveying container 10 into a raw material receiving means 17, which is shown by way of example as a truck 15. As indicated by the arrows, said truck can travel under the conveying container 10, such that the raw materials can be transferred from the conveying container 10 into the truck 15 by pouring through a lower opening.

FIG. 4 shows a side view of the raw material receiving station 16 with a raw material receiving means 17 in the form of a truck 15. The view shows the arrangement of the conveying container 10 above the truck 15, and the conveying container 10 is arranged in suspended fashion on the bearing cable 11.

The side view of the support element 13 shows the accommodation of the support element 13 in the form of a pillar which is accommodated in movable fashion on a foundation 22 by means of hinged joints 23. The hinged joints permit a movement of the support element 13 about the hinged joints 23, wherein, owing to the bracing of the bearing cable 11 with a tensile force in a first direction and the bracing to the mass-based anchor in a second direction by the bracing tension means, stability is imparted to the support element 13. The hinged arrangement of the support element 13 by means of the hinged joints 23 on the foundation 22 however makes it possible to realize a simple construction, because no transverse forces are introduced into the support element 13, and said support element can thus be of particularly simple design.

The invention is not restricted in terms of its design to the preferred exemplary embodiment specified above. Rather, numerous variants are conceivable which make use of the presented solution even in fundamentally different embodiments. All of the features and/or advantages that emerge from the claims, from the description or from the drawings, including design details or spatial arrangements, may be essential to the invention both individually and in a wide variety of combinations.

LIST OF REFERENCE DESIGNATIONS

1 Conveying installation
100 Slope
101 Lower height level
102 Upper height level
10 Conveying container
11 Bearing cable
12 Traction cable
13 Support element
14 Truck offloading station
15 Truck
16 Raw material receiving station
17 Raw material receiving means
18 Traveling carriage
19 Mass-based anchor
20 Bracing tension means
21 Drive unit
22 Foundation
23 Hinged joint
24 Support element
25 Truck ramp
26 Bracing tension means
27 Diverting roller

What is claimed is:

1. A conveying installation for opencast mining, the conveying installation configured to be positioned over an oblique slope of an opencast mine pit, wherein the conveying installation conveys raw materials from a lower height level on an extraction level of the opencast mine to an upper height level at a ground level adjacent to the opencast mine pit, the conveying installation comprising:
   a conveying container configured for suspended movement and configured to be loaded with raw materials at the lower height level and unloaded at the upper height level;
   a bearing cable for load-bearing and control of the conveying container and a traction cable for the suspended movement of the conveying container;
   a support element disposed at the upper height level, wherein the bearing cable is attached to the support element and the traction cable is guided on the support element;
   a truck offloading station disposed at the lower height level, wherein the conveying container is configured to be guided to the truck offloading station such that the raw materials can be introduced from a truck, which can be driven to the truck offloading station, into the conveying container by way of a pouring process;
   a raw material receiving station disposed at the upper height level, wherein the conveying container is configured to be guided over the raw material receiving station such that the raw materials can be unloaded from the conveying container into a raw material receiving means, wherein the conveying installation is configured to be incorporated into a truck transport operation for the raw materials; and
   a drive unit disposed adjacent to the support element at the upper height level, into which drive unit the traction cable can be pulled and out of which drive unit the traction cable can be deployed.

2. The conveying installation of claim 1 wherein the raw material receiving station comprises a truck loading station, wherein the raw material receiving means comprises a truck.

3. The conveying installation of claim 1 wherein the raw material receiving station comprises at least one of a bunker station, a crusher station, or a belt installation station into which the raw materials are unloaded from the conveying container.

4. The conveying installation of claim 1 wherein the raw material receiving station is disposed at the upper height level adjacent to the support element.

5. The conveying installation of claim 1 further comprising a traveling carriage on which the conveying container is disposed in suspended fashion, wherein the traveling carriage is guided on the bearing cable, wherein the traction cable is attached to the traveling carriage.

6. The conveying installation of claim 1 further comprising at least one of:
   a mass-based anchor disposed at the upper height level, wherein the support element is braced to the mass-based anchor at the upper height level by a bracing tension means; or
   a mass-based anchor disposed at the lower height level, wherein a bracing tension means braces a lower support element to the mass-based anchor at the lower height level.

7. The conveying installation of claim 1 further comprising foundations disposed at the upper height level, wherein at least one of the support element, the drive unit, or the raw material receiving station is accommodated on the foundations.

8. The conveying installation of claim 1 wherein the support element is configured as a hinged support, for which purpose the support element is held by a hinged joint.

9. The conveying installation of claim 1 wherein the support element is disposed at the lower height level adjacent to the truck offloading station.

10. The conveying installation of claim 1 wherein the truck offloading station comprises a truck ramp such that a truck can in the truck offloading station be driven to a height above the conveying container.

11. The conveying installation of claim 1 wherein the conveying container is loadable from an upper container side in the truck offloading station, wherein the conveying container is unloadable from a lower container side in the raw material receiving station.

12. The conveying installation of claim 1 wherein the bearing cable is a first bearing cable and the conveying container is a first conveying container, the conveying installation further comprising a second bearing cable and a second conveying container, wherein the first and second baring cables run parallel to one another, wherein on each of the first and second bearing cables one of the conveying containers is received by a respectively-associated traveling carriage, wherein the traction cable connects the first and second conveying containers for shuttle operation of the first and second conveying containers.

* * * * *